Dec. 10, 1957  K. C. BROWN  2,815,964
DETACHABLE TRAILER HITCH
Filed Jan. 17, 1957
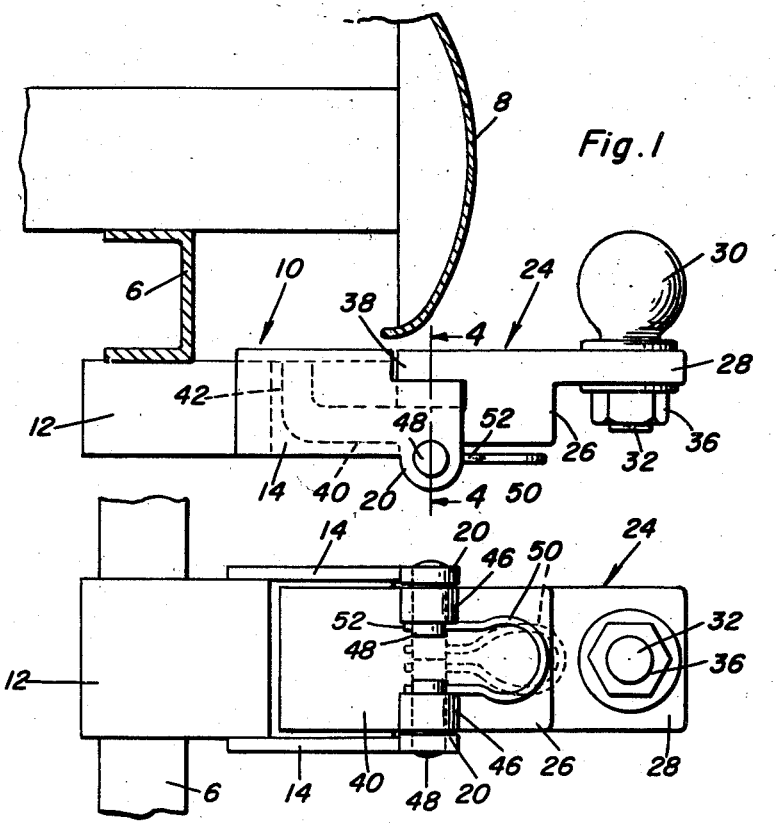
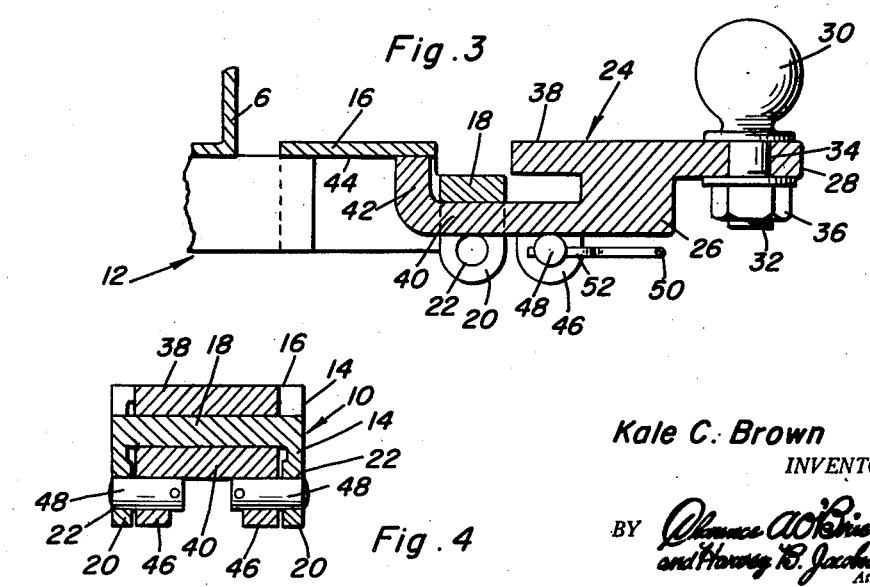
Kale C. Brown
INVENTOR.
BY
Attorneys United States Patent Office 2,815,964
Patented Dec. 10, 1957

2,815,964

DETACHABLE TRAILER HITCH

Kale C. Brown, Brainerd, Minn.

Application January 17, 1957, Serial No. 634,768

2 Claims. (Cl. 280—495)

The present invention relates to trailer hitch means, generally speaking, and has reference in particular to an improved structural adaptation which is characterized by two cooperating parts, that is, a fixture which is permanently mounted on the lead vehicle or tractor, and a bracket which is detachably connectible with the fixture, said bracket carrying the usual ball-type hitching member.

As the preceding general statement of the subject matter of the invention clearly implies trailer hitches in which the parts or units are separable are not new. In the circumstances, many and varied sectional trailer hitches have been devised and appropriated for use. In the belief that prior art accomplishments in this line of endeavor have apparently not met with widespread adoption and use gave rise to the instant endeavor. That is to say, it is the objective and purpose in the instance presentation to provide a structurally distinct trailer hitch construction and, in doing so, to provide one which is such that it will comply with manufacturing requirements and economies of manufacturers, will be recommended, it is believed, for use by tractor and trailer makers, and will aptly meet the needs of users and others.

A further objective is to improve upon and reduce the number of parts entering into the over-all combinations, thereby not only increasing the efficiency of the structure as an entity, but also rendering the same less costly to manufacture and to otherwise simplify and harmonize with the factors of assembling, sale, repair and so on.

Other and more specific objects will become more readily apparent from the following description and the accompanying drawings:

In the drawing, wherein like numerals are employed to designate like parts throughout the views:

Fig. 1 is a view in section and elevation showing a fragmentary portion of a trailer or an equivalent lead vehicle equipped with the improved trailer hitch;

Fig. 2 is a bottom plan view of the principal structural parts seen in Fig. 1;

Fig. 3 is a central longitudinal sectional view with portions in elevation; and

Fig. 4 is a transverse section on the vertical line 4—4 of Fig. 1 looking in the direction of the arrows.

Referring now to the drawings with the aid of reference numerals and with respect to Fig. 1 the chassis bar or channel to which the fixture is connected is denoted by the numeral 6 while the numeral 8 designates a bumper.

The fixture is denoted generally by the numeral 10 and is secured to the frame member by way of an adapter block or the like 12. The fixture has depending side walls 14 and a connecting wall or web 16. Thus the fixture may be said to be channel shaped in cross-section. The depending side walls are suitably joined with the adapter. Also, an inverted U-shaped step 18 is provided as an integral part of the fixture and this has depending aligned ears 20 with apertures 22 providing keepers.

The detachable part or unit, as before touched upon, is here distinguished as a hitching bracket and is denoted by the numeral 24. It is characterized by a solid body portion 26 which, as shown in Fig. 3, has an extension 28 at one end to which the ball-type hitch member 30 is connected. The member 30 is provided, as usual, with a stem or shank 32 passing through a hole in the extension 28 as indicated at 34 and is held in place by the nut 36. The forward end portion of the body is bifurcated and the upper relatively short furcation is denoted at 38. The longer furcation therebeneath is denoted at 40 and this has an upbent terminal end 42 which serves not only as a guide but a stabilizer too. This upturned or guide has sliding contact with the flat underneath side of the web 16 as at 44. The bracket is shown in its fastened or latched position in Figs. 1, 2 and 4. It is shown in its open or applicable and removable position in Fig. 3. It will be noticed in this connection that the intermediate portion of the lower furcation is provided with a pair of opposed lugs 46 having projectible and retractible latch bolts or pins 48 operatively mounted therein. The pins, that is, the outer ends thereof are adapted to project into the keeper holes 22 as seen in Fig. 4. They may be withdrawn, however, and unlatched in an obvious manner. To maintain the pins in place a U-shaped spring clip 50 is provided and this has its arm portions or limbs 52 connected with the inner adjacent axially aligned ends of the pins. The spring is intended to be manually handled, that is, it may be caught hold of with the fingers and the limbs pressed together as shown in dotted lines in Fig. 2 which serves to withdraw or retract the pins or latch bolts 48 from the keeper ears 20.

The furcations 38 and 40 function as jaws and straddle the step 18 whereupon the latter serves as a satisfactory anchor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A trailer hitch comprising, in combination, a fixture having a rigid inverted U-shaped step-like anchor embodying a pair of depending keeper ears, a bracket separate from but adapted to be detachably mounted and retained on said fixture, said bracket being provided with a ball-type hitch member and being bifurcated and providing a pair of upper and lower furcations, said furcations being parallel and adapted to straddle the bight portion of said anchor, the upper furcation being relatively short and the lower furcation being longer than the upper furcation and substantially L-shaped and providing an upturned stabilizing and guide member at the free end of the furcation, said lower furcation being provided intermediate its ends with a pair of depending lugs adapted to be aligned with said keeper ears, and spring biased latch bolts operatively mounted in said lugs and releasably cooperable with said keeper ears.

2. For use in conjunction with an anchoring permanently mounted on a vehicle, a readily attachable and detachable bracket having an extension at one end provided with a ball-type hitching member, the opposite end of said bracket being bifurcated and providing a pair of upper and lower furcations disposed in spaced parallel relationship, the upper furcation being relatively short and straight, the lower furcation being appreciably longer and L-shaped, the free end of said L-shaped furcation being upturned and providing a stabilizing and guide member, the intermediate portion of the longitudinal edges of said L-shaped furcation being provided with opposed depending lugs, a projectable and retractable latch bolt operatively supported in each lug, and a U-shaped spring underlying said bracket and having limb portions operatively connected to adjacent inner ends of said latch bolts.

References Cited in the file of this patent

UNITED STATES PATENTS

| | | |
|---|---|---|
| 464,201 | Rowland | Dec. 1, 1891 |
| 2,570,933 | Fobes | Oct. 9, 1951 |